April 14, 1964 C. F. TRENDLE 3,128,679
SEALING AND STOP MEANS FOR FLUID MOTORS
Filed April 26, 1962 2 Sheets-Sheet 1
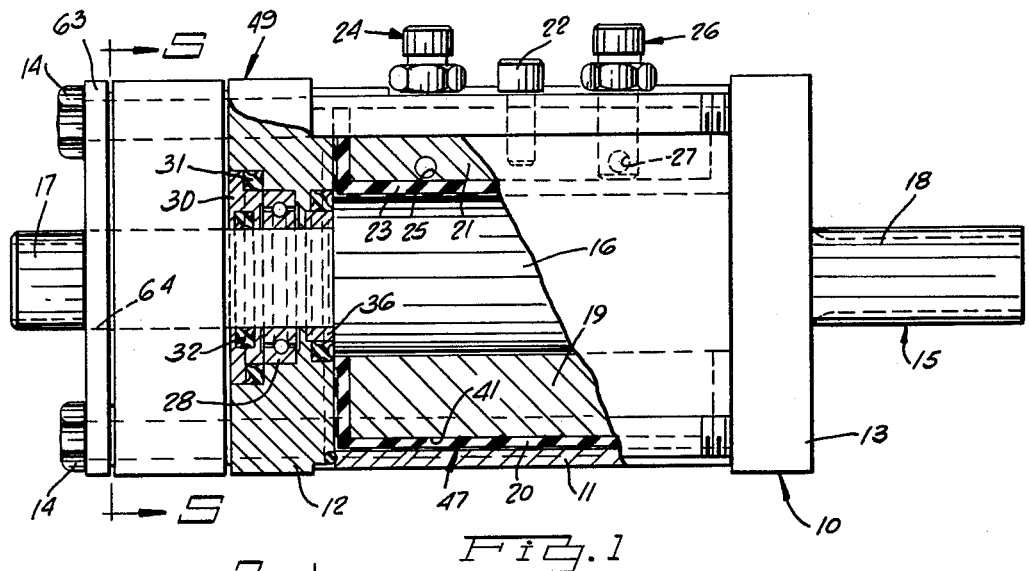
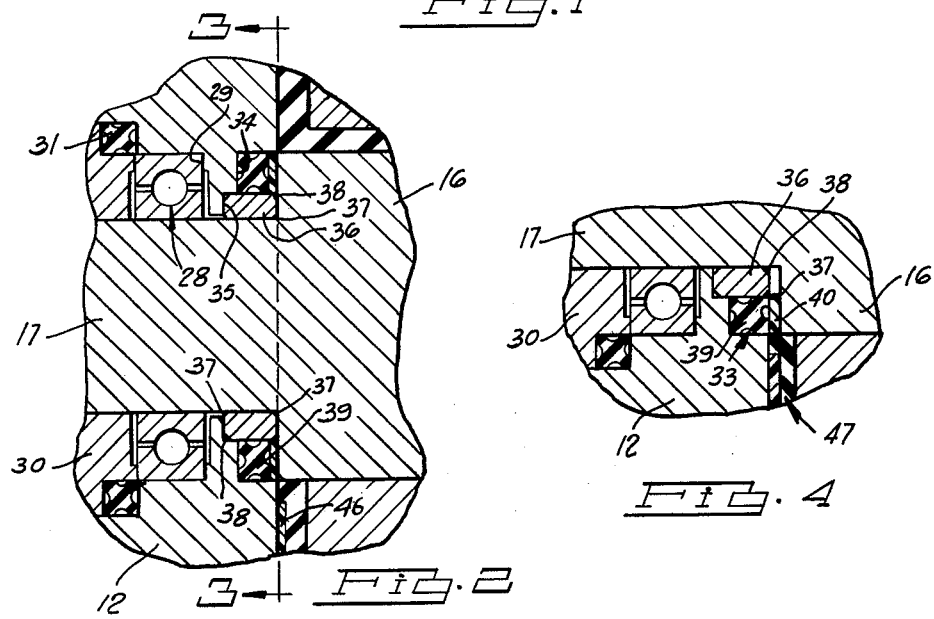
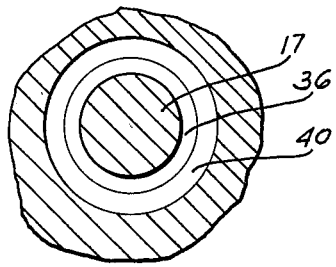
INVENTOR.
CARL F. TRENDLE
BY
Donnelly, Mentag & Harrington
ATTORNEYS April 14, 1964   C. F. TRENDLE   3,128,679
SEALING AND STOP MEANS FOR FLUID MOTORS
Filed April 26, 1962   2 Sheets-Sheet 2
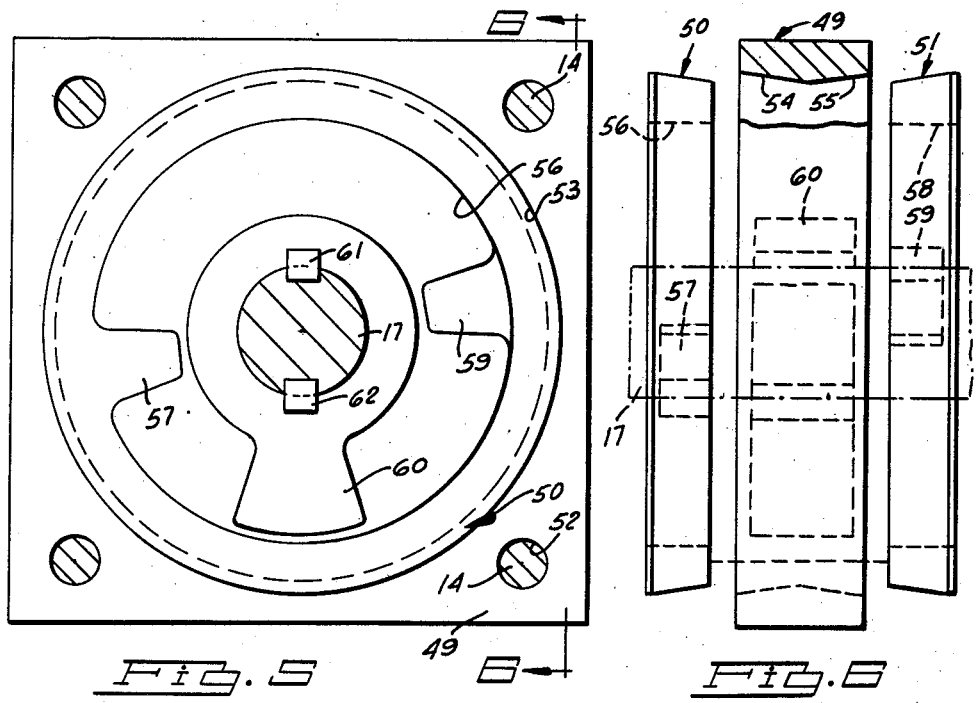
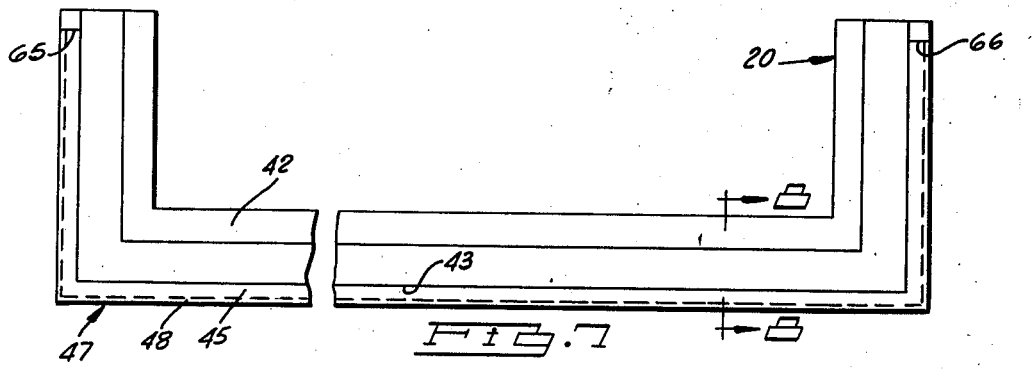
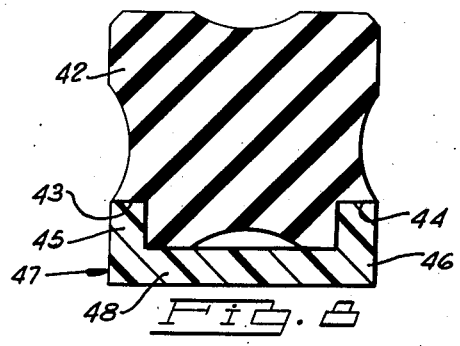
INVENTOR.
CARL F. TRENDLE
BY
Donnelly, Mentag & Harrington
ATTORNEYS

… … …

United States Patent Office 3,128,679
Patented Apr. 14, 1964

1

3,128,679
SEALING AND STOP MEANS FOR
FLUID MOTORS
Carl F. Trendle, St. Clair Shores, Mich., assignor to
Roto Actuator Corporation, a corporation of
Michigan
Filed Apr. 26, 1962, Ser. No. 190,367
4 Claims. (Cl. 92—13)

This invention relates generally to oscillating fluid motors and more particularly to a novel and improved sealing and stop means for fluid actuated oscillating motors adapted to provide reciprocating rotary motion through a portion of a revolution.

It is an important object of the persent invention to provide an improved sealing means for sealing the shaft of a rotary oscillating motor at each end thereof and for sealing the stator and rotary vane of an oscillating motor in an efficient manner and over a longer period than heretofore possible with prior art sealing means.

It is another object of the present invention to provide an improved and efficient sealing means for sealing the ends of the rotary shaft, the stator and vane of an oscillating motor and which sealing means includes a backing portion and an outer sealing contact member which is made from a suitable plastic material as "Teflon" plastic material or the like, and wherein the backing member functions as a spring to maintain the plastic sealing portion in constant sealing engagement with the adjacent motor part.

It is still another object of the present invention to provide a sealing means for an oscillating fluid motor which comprises a combination structure of a sealing portion and a backing or spring portion and which provides good break-away friction characteristics with good sealing contact and a low wear factor.

It is a further object of the persent invention to provide an improved stop means for an oscillating fluid motor which is adapted to be externally mounted on the motor and which is compact, simple in construction, economical of manufacture and may be used under heavy load or high speed operations.

It is still another object of the persent invention to provide a novel and improved sealing means for an oscillating fluid motor which is simple and compact in construction, economical of manufacture, efficient in operation and which provides long sealing life.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a side elevational view of a fluid oscillating motor, with parts broken away and with parts shown in section, and showing the motor provided with a novel and sealing stop means made in accordance with the principles of the persent invention;

FIG. 2 is a fragmentary, elevational sectional view, slightly enlarged of the sealing means illustrated in FIG. 1;

FIG. 3 is a fragmentary, sightly reduced, elevational sectional view of the structure illustrated in FIG. 2, taken along the line 3—3 thereof, and looking in the direction of the arrows;

FIG. 4 is a fragmentary view of a part of a structure of FIG. 2, and showing the backing sealing ring in a free state before being compressed;

FIG. 5 is an elevational sectional view of the structure illustrated in FIG. 1, slightly enlarged, taken along the line 5—5 thereof and looking in the direction of the arrows;

FIG. 6 is a side elevational view of the stop means structure illustrated in FIG. 5, taken along the lines 6—6 thereof and showing the stop means parts in a slightly spread-apart position;

FIG. 7 is an enlarged, broken, side elevational view of an oscillating fluid motor stator and oscillating vane sealing means employed in the invention; and, FIG. 8 is an enlarged, elevational sectional view, of the sealing means structure illustrated in FIG. 7 taken along the line 8—8 thereof and looking in the direction of the arrows.

Referring now to the drawings, and in particular to FIGS. 1 through 4, wherein is illustrated an oscillating fluid motor made in accordance with the principles of the present invention, the reference numeral 10 generally indicates a typical oscillating rotary fluid motor which may be provided with the novel and improved sealing and stop means of the present invention. A typical oscillating fluid motor of this type is illustrated in various prior art patents, as for example, in the United States Patents Nos. 2,941,513 and 2,793,623.

Fluid motors of the type indicated by the numeral 10 include a hollow cylindrical body member 11 which is enclosed at both ends by means of the head members 12 and 13. The head members 12 and 13 are fixedly secured on the body member 11 by any suitable means as for example, by the four tie rods designated by the numerals 14. The tie rods 14 are adapted to be evenly disposed about the body member 11 with the ends thereof being threaded and extended through one of the head members and being threadably engaged in the other head members in a conventional manner.

The reference numeral 15 generally indicates the fluid motor shaft which is provided with the enlarged portion 16 mounted within the body 11 and the outwardly extended, reduced end portions 17 and 18. The rotor member of the fluid motor 10 comprises the enlarged shaft portion 16 and a fixedly connected vane portion 19 which is provided with a U-shaped seal 20 around the outer periphery thereof. The improved seal 20 will be described in detail hereinafter. The motor 10 further includes the stator 21 which is fixedly secured within the body 11 by any suitable means as by means of the bolt 22 and around the inner periphery thereof on which is mounted the U-shaped sealing means 23 which is formed similar to the U-shaped sealing means 20 and which will be described hereinafter. The motor 10 is provided with the usual fluid inlet and exhaust means for admitting fluid under pressure to either side of the vane 19 for moving the same in either one rotary direction or the other and such means is shown by the numerals 24 and 26. The inlet means or fitting 24 extends into the stator 21 in the usual manner and is provided with an outlet port 25 for communication with the interior of the motor body 11 on one side of the vane 19. The inlet fitting 26 is similar to the fitting 24 and has the outlet 27 for communication with the opposite side of the vane 19 to admit fluid pressure against said opposite side of the vane 19. It will be understood that the fluid under pressure is admitted in the usual manner either through the fitting 24 or 26 to exert fluid pressure on one side or the other of the vane 19 to oscillate the vane in one direction or the other to turn the shaft ends 17 and 18 and carry out a useful function as for example, to index a workpiece, to operate a cam and machine tool, or operate a clamping means or the like.

As shown in FIGS. 1, 2 and 3, the output ends of the rotor shaft 15 are operatively journaled in roller bearings as for example, the roller bearings 28 which are operatively mounted in a suitable stepped recess as 29 in the head members 12 and 13. The mounting structure for the shaft 15 is the same in each end of the motor and because of this, only one end of the shaft bearing and sealing means has been illustrated. The roller bearings 28 that are retained in place by the retainer plate 30 which are adapted to be threadably mounted in the head members 12 and 13 are retained therein by any suitable means.

As shown in FIGS. 1 and 2, a suitable bearing retainer seal 31 is operatively mounted between each of the retainer plates 30 and the respective bearing 28. Each of the retainer plates 30 is provided with an outer shaft seal as 32 for preventing leakage on the output shaft ends 17 and 18. Any suitable sealing ring may be used for the sealing rings 31 and 32, as for example, the sealing ring shown in U.S. Patent No. 2,873,132, is a suitable sealing ring for such purposes.

As shown in FIGS. 1 through 4, an inner shaft seal member means is provided at each end of the rotor portion 16 but only one end is shown since each end is similar. As shown in FIGS. 1, 2 and 3, the novel and improved shaft sealing means is generally indicated by the numeral 33 and is mounted in a stepped recess found in the inner face of the annular boss of the head portion 12. The aforementioned stepped recess comprises an outer enlarged portion 34 and an inner reduced portion 35. The sealing means 33 comprises an annular metal sleeve member, preferably formed from a suitable bearing metal as S.A.E. 660 bronze and indicated by the numeral 36. The ends 17 and 18 of the output shaft 15 are threadably mounted through the sleeve members 36. The edges of the inner periphery of the sleeve member 36 are chamfered, as indicated by the numeral 37. The outer corners of the outer periphery of the sleeve member 36 are also chamfered as indicated by the numeral 38.

A second annular member 39 is concentrically mounted around the approximately inner two-thirds of the metal sleeve 36. A sealing member 39 is preferably mounted on the member 36 with a press fit. The metal sleeve 36 is adapted to be seated in the inner reduced portion 35 of the stepped recess in the head member 12 and the seal member 39 is adapted to be seated in the outer enlarged portion 34 of the said stepped recess. The annular seal member 39 is adapted to be made from any suitable sealing material and, preferably is made from a sealing material available on the market and known as "Buna N 70 Duro-Moly." The annular sealing members 39 may be made from the same material and outer shape and cross-sectional shape as the sealing members 31 and 32 as shown by the aforementioned U.S. Patent No. 2,873,132.

As shown in FIGS. 1 through 4, an annular member 40 is seated around the inner end of the metal sleeve 36 and its abuts the inner end of the sealing member 39. The sealing member 40 has a flat inner and outer face and the inner face thereof abuts the shoulder of the enlarged shaft portion 16. The sealing ring 40 is made from a suitable plastic material which has good wear and bearing characteristics, as for example, the plastic available on the market under the trade name "Teflon." The term "plastic" as used in the claims hereinafter is meant to include plastic materials of the type illustrated by the plastic "Teflon." That is, the term "plastic" is meant to include organic materials, synthetic or not, which have good wear and bearing characteristics.

FIG. 4 shows the bearing ring 39 and the ring 40 in the free state before the shaft 16 has been moved in place against the same and in an operative position. The operative position is shown in FIG. 2.

It will be seen that the inner sealing ring 39 functions as a spring to maintain an inwardly directed pressure against the plastic sealing ring 40 to maintain it against the shaft 16. The sealing rings 39 and 40 function as a combination seal and spring unit and provides not only good sealing contact but more efficient sealing and over a longer life than when similar prior art devices are used. The use of a plastic material as "Teflon" for the ring 40 provides good break-away friction characteristics whereby lower break-away power is required when the motor is started to move in one direction or the other. The use of a plastic material as "Teflon" for the ring 40 provides a sealing means for the shaft which has a low wear characteristic. The "Teflon" sealing ring 40 may be of any suitable thickness, but it has been found that a thickness of one-sixteenth of an inch is a desirable thickness.

In the operative state or condition, with the head members 12 and 13 secured in position, the sealing member 39 is compressed in the recess 34 and the shoulders on the shaft portion 16 abut the inner ends of the metal sleeve 36, as shown in FIG. 2, any endwise thrust load is thus taken by the metal sleeves 36.

FIGS. 1, 7 and 8 illustrate an improved U-shaped sealing means for the stator 21 and the rotating vane 19 of an oscillating fluid motor. The U-shaped sealing means 20 and 23 for the vane 19 and stator 21, respectively, are similarly made and the illustrative example in FIGS. 7 and 8 will be indicated by the numeral 20. The sealing means 20 is adapted to sit in a suitable recess as 41 which is formed around the outer sides of the vane 19 in a conventional manner. The improved sealing means comprises the inner U-shaped portion 42 which is formed from the same material as the shaft sealing means, 31, 32 and 39 and which may be formed with the same cross-sectional shape and material and teaching of the aforementioned U.S. Patent No. 2,873,132. As shown in FIGS. 7 and 8, the outer U-shaped edge of the inner sealing portion 42 is provided with the recesses 43 and 44 along each side thereof and these recesses extend to about ⅛ inch from the ends of the sealing means 20, to the points 65 and 66, and they are adapted to receive the legs 45 and 46, respectively, of a U-shaped outer sealing member generally indicated by the numeral 47. The U-shaped member 47 is U-shaped in overall configuration as viewed from the side thereof in FIG. 7, and is also U-shaped in cross-section as shown in FIG. 8. The bight portion 48 of the member 47 is integrally formed with the leg portions 45 and 46. The U-shaped sealing member 47 is also made from the aforementioned plastic material sold under the trade name "Teflon," or from any other suitable plastic material having good wear and bearing characteristics. The U-shaped sealing member 47 is preferably secured to the inner sealing part 42 by any suitable means, preferably by means of a suitable resin, as for example, any resin of the epoxy type.

It will be seen that the provision of an outer facing or covering of plastic material as 47 on the sealing member 20 provides the same low wear characteristics as is provided in the shaft seal means 33 and the inner sealing member 42 also functions as a spring member to continuously urge or bias outwardly the outer sealing portion 47 into sealing engagement with the adjacent motor parts. The stator sealing means 23 would also be formed in accordance with the sealing member 20 and in accordance with the construction shown in FIGS. 7 and 8.

FIGS. 5 and 6 illustrate a novel and improved stop means adapted for use with the rotary motor illustrated in FIG. 1. The taper lock stop means shown in FIGS. 5 and 6 include the housing plate 49 and the two stop plates 50 and 51. As shown in FIG. 1, the stop means would be mounted on one end of the fluid motor 10 as for example, over the out-put shaft end 17. The housing plate 49 is shown in FIG. 5 as being square in overall configuration and it is adapted to be secured to the head portion 12 of the motor by any suitable means as by the bolts 14 passing through suitable holes 52. The housing 49 is provided with an angular opening 53 therethrough and this opening tapers inwardly and toward the center of the plate from each side thereof as indicated by the numerals 54 and 55 in FIG. 6. The angle of the tapers 54 and 55 is approximately 5°. The stop plates or members 50 and 51 are similarly formed. As shown in FIGS. 5 and 6, the stop plate 50 is formed as a ring member having an outer periphery which is circular and which is tapered inwardly towards the center thereof at a 5° taper whereby the member 50 is adapted to be seated within the housing 49 on one side thereof and to rest on the tapered surface 54. The stop ring 51 is also provided with a similar taper on the outer periphery thereof whereby it is adapted to be seated within the housing member 49 on the tapered surface 55. The stop member 50 is provided with a circular opening 56 therethrough and this member is also provided with an inwardly extended projection or stop member 57 as shown in FIG. 5. The stop member 51 is also provided with the circular opening 58 therethrough and with an inwardly extended radially disposed stop member 59 similar to the stop member 57 on the stop ring 50.

As shown in FIG. 5, a pawl 60 is fixedly mounted on the shaft 17 by any suitable means as by means of the usual or conventional keys 61 and 62. It will be seen that if the stop springs 50 and 51 are rotated to suitable positions as shown in FIG. 5, the shaft 17 may be rotated from a position whereby the pawl 60 is disposed against the stop member 57 to a new position in a clockwise direction whereby the pawl 60 is disposed against the stop member 59. The stop rings 50 and 51 may be adjusted to various positions within the housing 49 whereby the stop members 57 and 59 may be used to control the overall movement or extent of movement of the shaft 17 in a radial direction, or rotary direction, since the pawl 60 extends radially outwardly from the shaft 17 and the stop members 57 and 59 extend into the path of the pawl 60. The pawl 60 is thick enough or broad enough so that it over-laps the width of both of the stop members 57 and 59, although they are located on opposite sides of the housing 49. The stop structure of the device shown in FIGS. 5 and 6 prevents shock load to the internal components of an oscillating motor.

As shown in FIG. 1, the taper lock stop means of the present invention would be provided with an end plate as 63 which would be mounted on the outer side of the stop ring 50 so as to clamp the stop rings 50 and 51 into the housing 49 when the bolts 14 are drawn tightly into place. The plate 63 would be a flat plate of the same configuration as the housing 49 and it would be provided with a hole therethrough as 64 for passage of the shaft 17. Experience has shown that the adjustable taper lock stop means of the present invention is an efficient and safe means for controlling the degree of rotation of a fluid motor having either single or double vanes.

The plastic material sold under the trademark "Teflon" is defined in the "Materials Handbook" (An Encyclopedia for Purchasing Agents, Engineers, Executives and Foremen, by George S. Brady, eighth edition, McGraw-Hill Book Co., Inc., 1956), as polymerized tetrafluoro ethylene ($CF_2CF_{2n}$).

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In an oscillating fluid motor having a body member, a head member on each end of said body member, a stator and a rotor in said body member, said rotor including a shaft having an enlarged portion carrying a vane and an output end portion extended outwardly through a shaft bore in one of the head members, the combination comprising:
    (a) a compressible outer sealing ring in a recess in said one head member on the inner side thereof, around the shaft output end, said recess being formed around the inner end of said shaft bore and communicating with the same,
    (b) an inner plastic sealing ring in said recess disposed against the inner side of said outer sealing ring and biased by the same into sealing engagement with the peripheral edge of the end of the enlarged shaft portion; and,
    (c) a sleeve bearing mounted in said recess against the enlarged portion of said shaft and between the rotor shaft and both of said sealing rings.

2. In an oscillating fluid motor having a body member, a head member on each end of said body member, a stator and a rotor in said body member, said rotor including a shaft having an enlarged portion carrying a vane and an output end portion extended outwardly through a shaft bore in one of the head members, the combination comprising:
    (a) a compressible outer sealing ring in a recess in said one head member on the inner side thereof, around the shaft output end, said recess being formed around the inner end of said shaft bore and communicating with the same,
    (b) an inner plastic sealing ring in said recess disposed against the inner side of said outer sealing ring and biased by the same into sealing engagement with the peripheral edge of the end of the enlarged shaft portion;
    (c) a U-shaped sealing means around the inner edge and side edges of said stator and in sealing engagement with the enlarged portion of the shaft;
    (d) a U-shaped sealing means around the outer edge and side edges of said vane and in sealing engagement with the enlarged portion of the shaft;
    (e) each of said U-shaped sealing means comprising, a compressible inner sealing portion and an outer plastic sealing portion mounted on the outer side of said inner sealing portion; and,
    (f) a sleeve bearing mounted in said recess against the enlarged portion of said shaft and between the rotor shaft and both of said sealing rings.

3. The structure defined in claim 2, wherein: said outer plastic sealing portion is U-shaped in cross-section.

4. The structure defined in claim 2, including: a stop means comprising, a pawl fixed on said shaft output end portion, a housing mounted on said body member and encircling said pawl, and, a pair of adjustably mounted stop members mounted in said housing and adapted to engage said pawl for stopping the movement thereof at opposite ends of a rotary movement of said shaft.

References Cited in the file of this patent

UNITED STATES PATENTS

| | | |
|---|---|---|
| 710,212 | Reynolds | Sept. 30, 1902 |
| 955,766 | Connell | Apr. 19, 1910 |
| 1,520,233 | Gabriel | Dec. 23, 1924 |
| 2,050,482 | Blood et al. | Aug. 11, 1936 |
| 2,141,953 | Hawes | Dec. 27, 1938 |
| 2,735,406 | Britton | Feb. 21, 1956 |
| 2,893,794 | Ilens | July 7, 1959 |
| 2,902,009 | Ludwig et al. | Sept. 1, 1959 |
| 2,966,144 | Self | Dec. 27, 1960 |
| 3,030,934 | Herbst | Apr. 24, 1962 |
| 3,066,654 | Matt | Dec. 4, 1962 |